United States Patent [19]

Schachle et al.

[11] 4,323,331
[45] Apr. 6, 1982

[54] WINDMILL TOWER

[76] Inventors: Charles Schachle, 1032 Grant St., Moses Lake, Wash. 98837; Patrick J. Schachle; Edward C. Schachle, both of 18427 Military Rd. S., Seattle, Wash. 98188; John R. Schachle, 625 Wellington, #A-12, Walla Walla, Wash. 99362

[21] Appl. No.: 33,894

[22] Filed: Apr. 27, 1979

[51] Int. Cl.³ .............................................. F03D 11/04
[52] U.S. Cl. .................................. 416/9; 416/244 R; 52/116
[58] Field of Search .............. 416/9, DIG. 6, 121 A, 416/10, 11, 244; 52/116

[56] References Cited

U.S. PATENT DOCUMENTS 4,180,369 12/1979 Ottosen ............................ 416/11 X
4,201,514 5/1980 Hutter ............................ 416/132 B

FOREIGN PATENT DOCUMENTS 500792 2/1951 Belgium ............................ 416/11
357583 8/1922 Fed. Rep. of Germany ... 416/DIG. 6
409369 2/1945 Italy ............................ 416/DIG. 6

OTHER PUBLICATIONS

Machine Design; vol. 48; No. 12; May 20, 1976, pp. 18-20, 23-26.

*Primary Examiner*—Everette A. Powell, Jr.
*Attorney, Agent, or Firm*—Christie, Parker & Hale

[57] ABSTRACT

A windmill tower supports a propeller and a platform that in turn supports a propeller feather control system and a generator system. The entire tower rotates at its base under changes in wind direction so the rotating propeller is constantly maintained upwind of the tower. The tower is a rigid structure that withstands cyclic thrust and torque loading sufficiently to reduce resonant vibrations of the tower as the propeller rotates under the influence of the wind. The resonant frequency of the tower can be higher than the passing frequency of the rotating propeller blades. The tower includes a pair of generally upright fore legs that converge upwardly toward a first apex on the propeller axis of rotation near the front of the platform immediately behind the propeller hub. A diagonal bracing strut extends downwardly from the first apex away from the plane of the fore legs and toward the rear of the tower. The bottoms of the fore legs and the diagonal bracing strut are rigidly interconnected by base plane truss members. A pair of upwardly converging aft legs extend diagonally upwardly from the bottoms of the fore legs toward a second apex aft of the first apex at the rear of the platform. At regular vertical intervals, stiffening trusses add rigidity to the main upright members of the tower structure. The natural frequency of the tower is raised by the fore legs and the diagonal bracing strut being interconnected in a rigid base plane truss. The diagonal bracing strut resists thrust loading on the tower, and the fore legs and aft legs resist torsional forces produced at the top of the tower.

52 Claims, 8 Drawing Figures

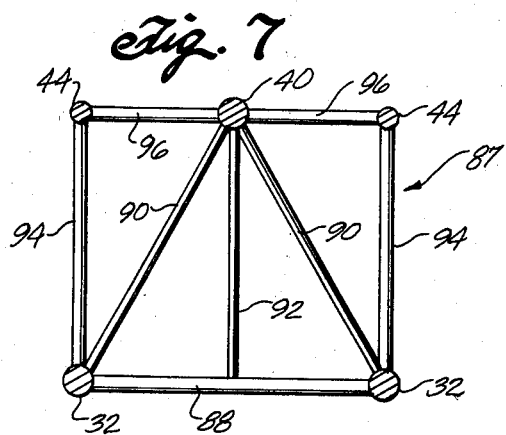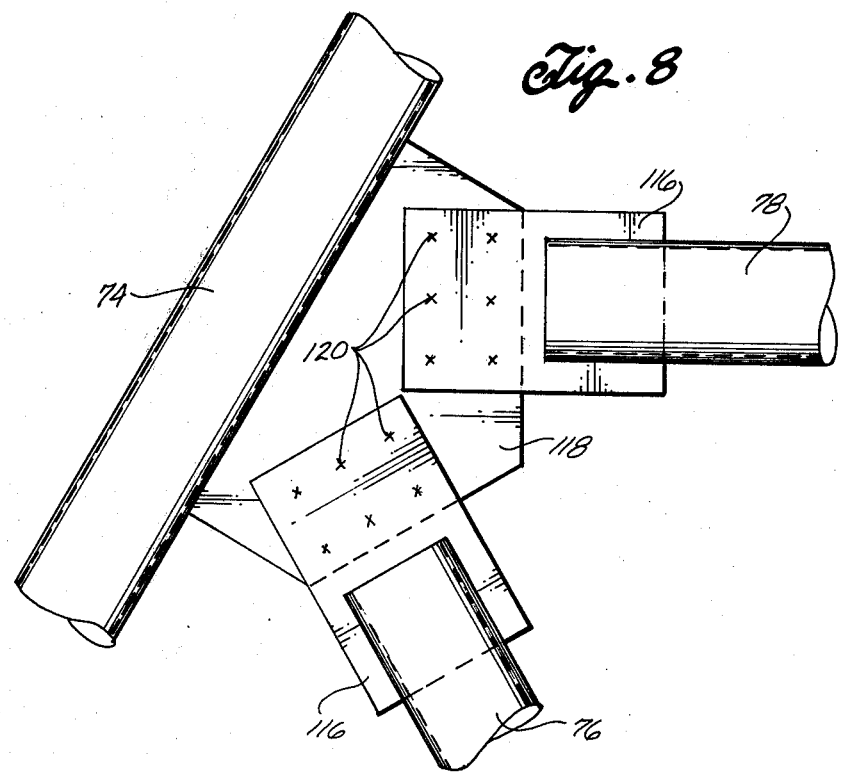

WINDMILL TOWER

BACKGROUND OF THE INVENTION

The present invention relates in general to wind-driven power generation devices, and more particularly to a tower for supporting a windmill rotor.

Windmills have been known since ancient times. They extract power from the wind and usually the power is used in driving pumps for irrigation or to supply electrical power in rural areas. With the recent increase in energy costs, the attractiveness of wind power has improved.

Recently, consideration has been given to using wind power generators to supply electrical energy for utilities as an alternative to conventional electrical generation plants, hopefully to reduce the amount of costly fuel oil which is now used. However, windmills capable of generating sufficient power to provide a meaningful alternative source of energy are faced with a host of problems.

Wind conditions can vary widely. Wind can vary from geographic location to geographic location and from season to season. Some areas have a considerable amount of wind, while others are wind poor. Wind velocities and direction can fluctuate broadly in short periods of time. In areas where considerable wind exists, the diurnal changes in wind velocity can vary from almost nothing to a considerable value. A mean wind speed is often attendant with frequent gusting and lulls. The wind velocity can vary considerably in elevations close to ground.

A considerable amount of power exists in wind at high speeds. It can be desirable to locate windmills used for commercial power generation in areas having high wind speeds in order to maximize power generation output. A tower must be designed to avoid damage during high winds. In the past, windmill towers have been destroyed by the extremely high forces produced by high winds.

The present invention provides a windmill tower that can adapt well to varying wind conditions and can withstand high wind forces. As a result, the windmill can be used for large scale power generation. The windmill tower and propeller described in this application are large by windmill standards. The wind turbine will produce a rated three million watts of power in a 40 mph wind. It includes a 3-bladed upwind propeller with a diameter of 165 feet that will stand nearly 200 feet tall at the point of the highest blade rotation. The tower for supporting the rotor is mounted on a concrete and steel base. The entire tower structure and propeller pivot relative to the base as the propeller maintains a position upwind of the tower.

The rotatable tower makes it possible to use a large propeller that, in turn, generates a large amount of power. In most windmills the tower is fixed and the propeller pivots relative to the tower with changes in wind direction. The fixed tower should have a relatively wide base for properly supporting the weight of the propeller and its attendant rotating machinery. If the propeller pivots relative to a fixed tower, and if the tower has a wide base, the propeller blades are usually relatively short to avoid contact with the tower as the propeller changes direction with the wind. Silo towers also have been used, but they generally experience resonance problems and therefore have not proved suitable for large scale power generation applications. The rotatable tower of this invention is a wide base structure that supports the propeller blades at the side of the tower. Since the tower and propeller pivot together with changes in wind direction, the propeller blades do not contact the tower, and therefore long propeller blades can be used.

A windmill tower can be damaged or even destroyed by excessively large resonant vibrations during high wind conditions. In the windmill of this invention, the propeller operates upwind of its tower. There are three primary forces acting on the tower when the propeller rotates upwind of the tower. (1). As the blades of the rotating propeller pass the tower, the tower is cyclically excited by a cyclic thrust loading which tends to push and pull on the tower. (2). The cyclic thrust force of the wind against the propeller blades during varying wind conditions also tends to push and pull on the tower. (3). The tower is subject to cyclic torque loading from the rotating propeller, rotating machinery, and horizontal movement of the wind which produces a twisting or torsional moment in a horizontal plane on the top of the tower.

This invention provides a windmill tower structure having a stiffness that resists cyclic thrust and torque loading on the tower sufficiently to reduce resonant vibrations of the tower to an extent that the tower can safely support the propeller under high wind conditions while generating sufficient electrical power for electrical utility purposes.

SUMMARY OF THE INVENTION

Briefly, one embodiment of this invention provides a windmill tower for supporting a propeller. The tower has a pair of fixed fore legs spaced apart at their bottoms and converging upwardly toward an apex. A fixed diagonal bracing strut has a bottom spaced aft of the bottoms of the fore legs with respect to the plane of propeller rotation. The strut extends diagonally upwardly toward the apex. The fore legs and the strut have top portions in the vicinity of the apex spaced aft of the propeller. A rigid base structure secures the bottoms of the fore legs and the diagonal bracing strut together as a rigid unit in a base plane of the tower. A pair of fixed aft legs have top portions spaced aft of the apex. The aft legs extend downwardly adjacent opposite sides of the diagonal bracing strut. The aft legs are braced in a fixed position relative to the fore legs. A load support is rigidly secured to the top portions of the fore legs, the diagonal bracing strut and the aft legs for supporting a load from the propeller at the top of the tower.

The fore legs and diagonal bracing strut, being rigidly secured to a rigid base plane structure, aid in providing a stiff tower with a high natural frequency. The natural frequency of the tower can be higher than the passing frequency of rotating propeller blades of a propeller mounted atop the tower. This can significantly reduce resonant vibrations in the tower. The diagonal bracing strut is a compressive member that resists thrust loading on the tower which adds to the stiffness of the tower. The aft legs cooperate with the fore legs to resist torsional moments in a horizontal plane at the top of the tower. This also adds to the stiffness of the tower in providing its high natural frequency and attendant resistance to resonant vibrations.

These and other aspects of the invention will be more fully understood by referring to the following detailed description and the accompanying drawings.

DRAWINGS

FIG. 7 is a plan view of the tower structure taken at an elevation on line 7—7 of FIG. 3; and FIG. 8 is an enlarged fragmentary plan view illustrating a detailed construction of a typical joint in the tower structure.

DETAILED DESCRIPTION

Figure 1:
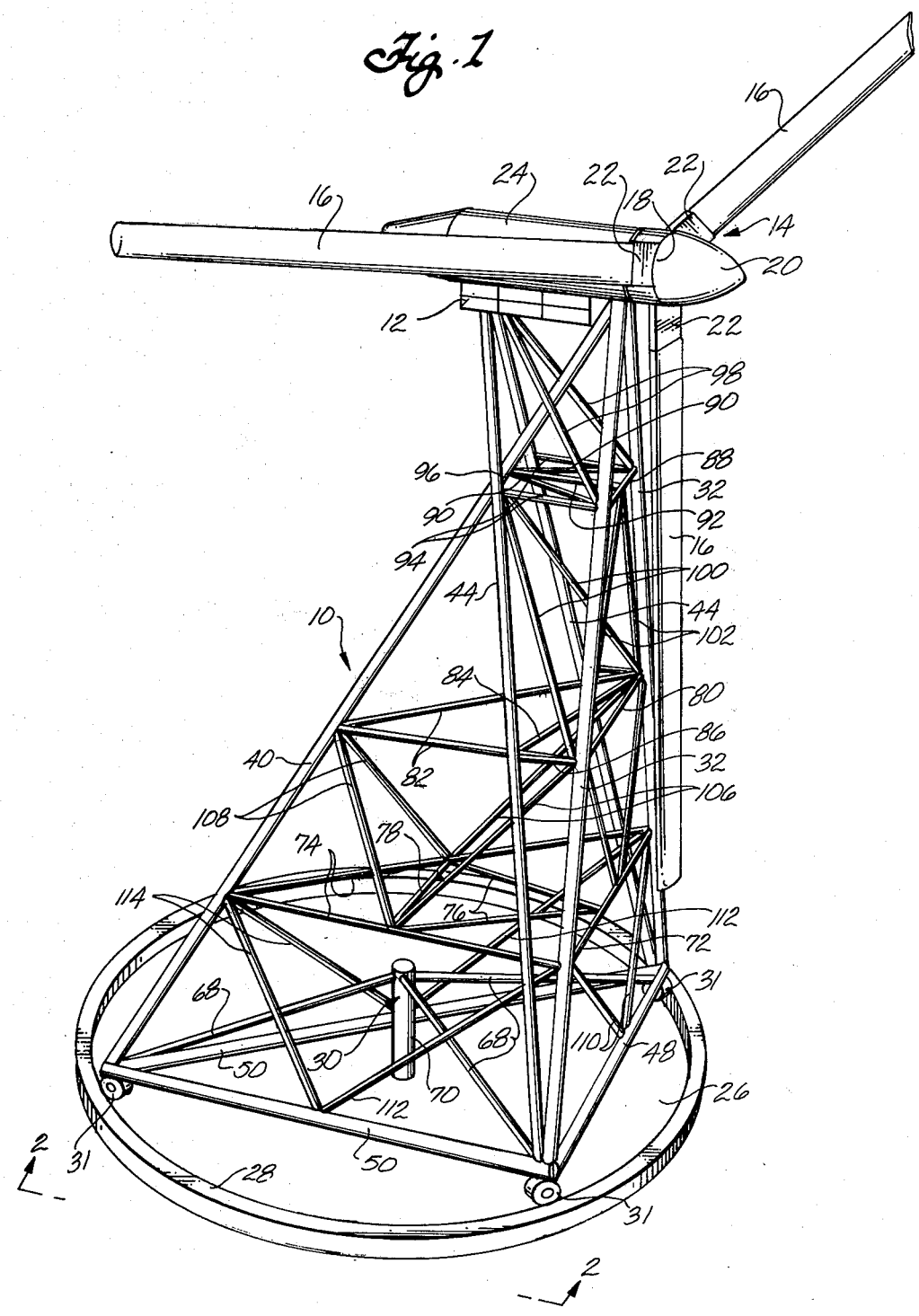
FIG. 1 is a semi-schematic perspective view illustrating a windmill tower according to principles of this invention.
Figure 2:
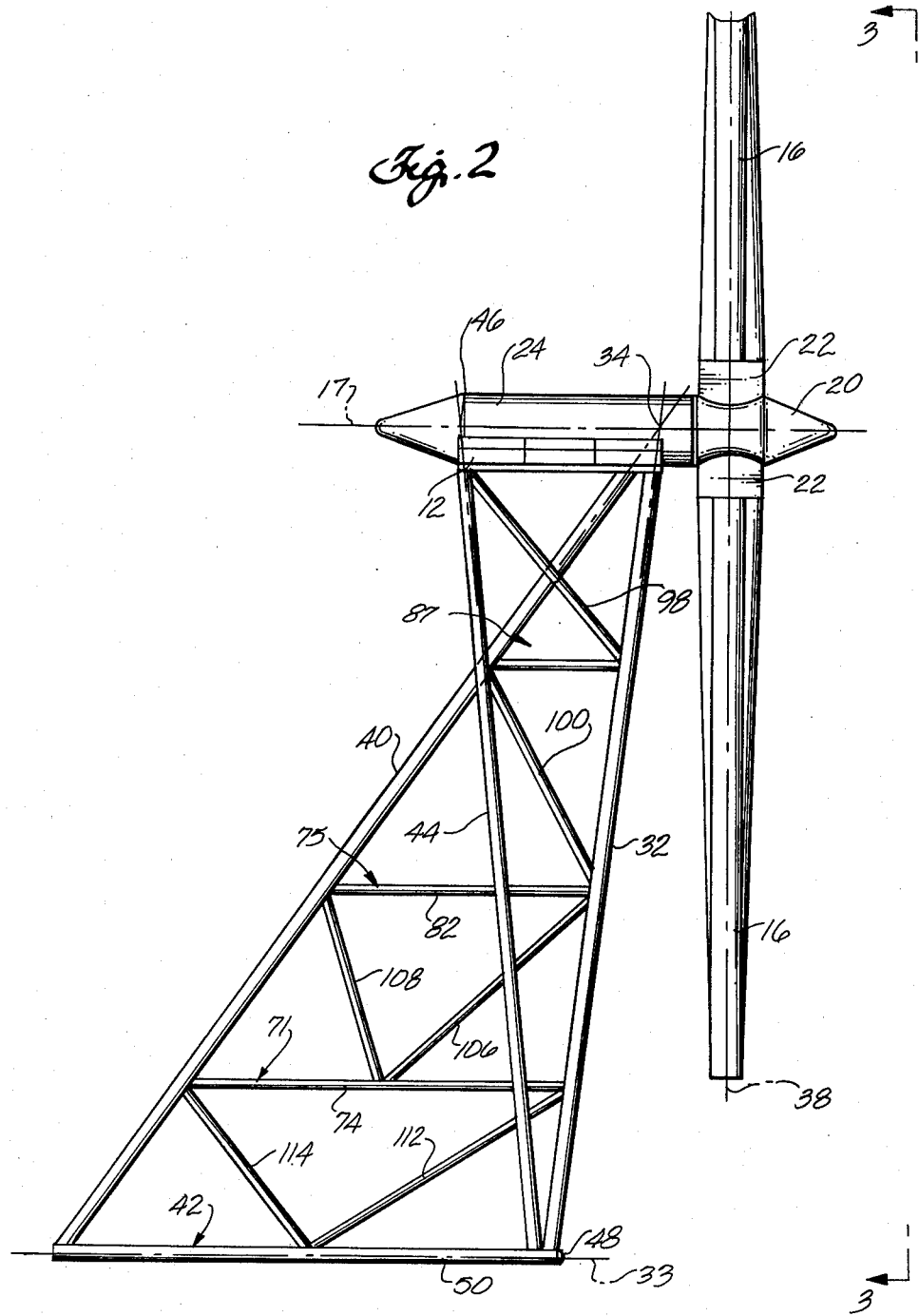
FIG. 2 is a side elevation view of the windmill tower taken on line 2—2 of FIG. 1.

Referring to FIG. 1, a windmill includes an upright tower 10 supporting a platform 12 in a horizontal position above the tower. The platform is rigidly affixed to the top of the tower. A propeller 14 is supported on the tower adjacent the platform. The propeller has three radially extending blades 16 spaced apart equidistantly about a horizontal axis of rotation 17 illustrated in phantom lines in FIG. 2. The propeller includes a variable pitch propeller hub cowling 18 capped by a streamline nose 20. A root fairing 22 for each propeller blade couples into the hub. The propeller blades extend in a vertical plane adjacent the side of the tower, and the blades are relatively long, extending for a major portion of the height of the tower.

The propeller is coupled to rotating machinery supported on the platform 12. A skin 24 encompasses portions of a generator system, propeller feather control components, and associated framework, all mounted on the platform. These portions are described in greater detail in my copending application referred to above; and they include a torque tube, hydraulic cylinder, gear box, motors, and attendant line and control circuitry.

The tower is mounted on a flat base 26. A circular track 28 at the periphery of the base guides the path of the tower as it rotates about a vertical axis through a pivot 30. Rollers 31 support the bottom of the tower for rotation on the base. The propeller blades rotate about the horizontal axis 17 in response to the wind acting on the propeller. As the propeller rotates about its axis, the entire tower rotates about the vertical axis through the pivot 30 to constantly maintain the propeller upwind of the tower.

Figure 3:
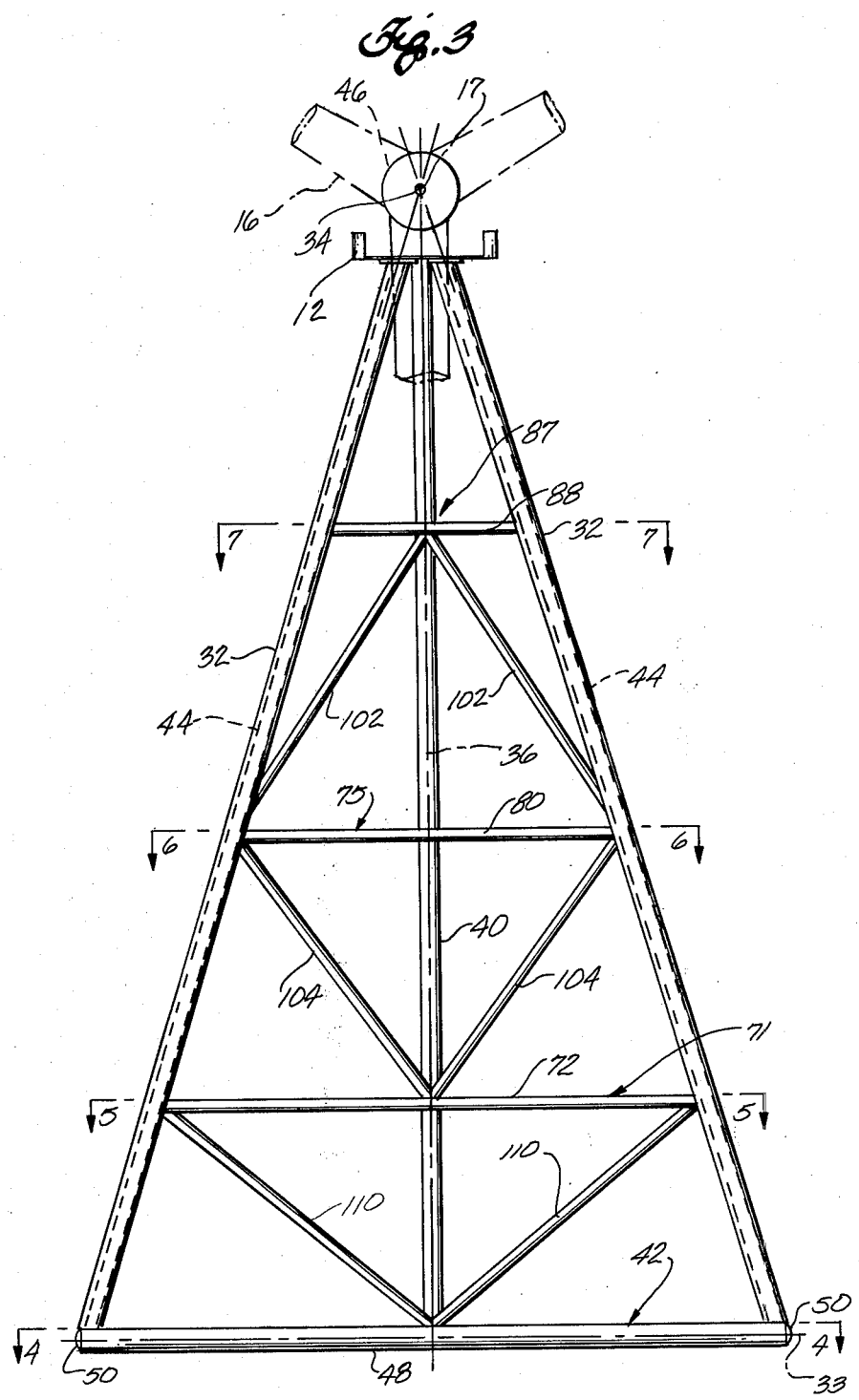
FIG. 3 is a front elevation view of the tower taken on line 3—3 of FIG. 2.
Figure 4:
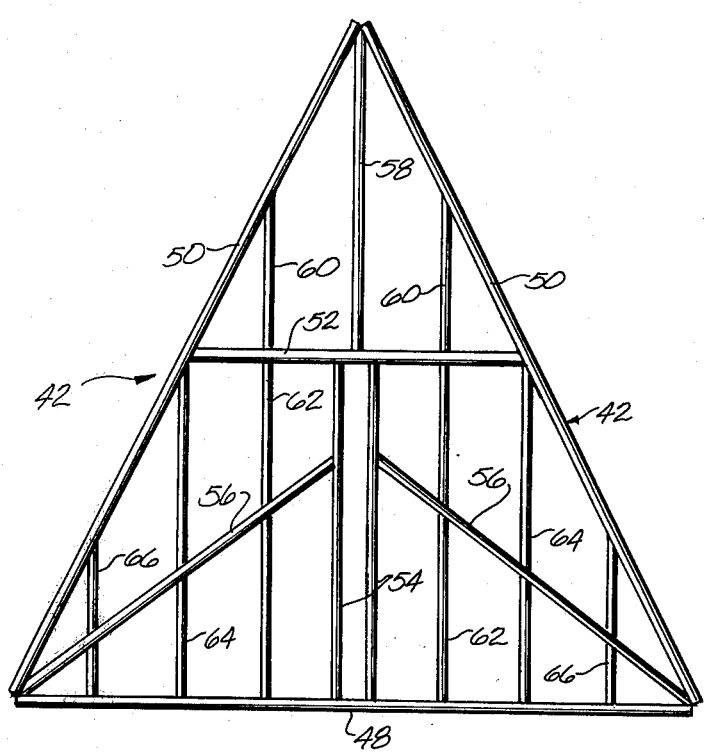
FIG. 4 is a plan view of the tower base structure taken on line 4—4 of FIG. 3.

The tower comprises a family of structural beams secured together as a rigid upright structure. Main structural members of the tower include a pair of upwardly converging fore legs 32 on a front side of the tower immediately aft of the propeller. The front side of the tower is defined with reference to the portion of the tower closest to the propeller, while a rear or aft side of the tower is that portion located farthest from the propeller. The bottoms of the fore legs are spaced apart on opposite sides of the propeller, and the bottoms of the fore legs are in a horizontal base plane 33 (see FIG. 2) at the bottom of the tower. The fore legs proceed upwardly from the base plane, tapering closer together and intersecting at a first apex 34 immediately aft of the propeller on the propeller axis of rotation 17. The fore legs, when viewed from the front side of the tower as in FIG. 3, are symmetrical about a vertical axis 36 through the first apex 34 and the propeller axis of rotation 17. As illustrated best in FIG. 2, the propeller extends generally in a vertical plane 38 spaced forward from the front side of the tower. The bottoms of the fore legs are aligned on an axis that extends generally parallel to the vertical plane 38 in which the propeller rotates. The bottoms of the fore legs are spaced farther from the vertical plane of the propeller than the tops of the fore legs. As illustrated best in FIG. 2, the fore legs extend diagonally forward and upward from the base plane 33 toward the plane 38 of the propeller. The fore legs extend upwardly from the base plane at an acute angle of about 83°. The plane of the fore legs intersects the vertical plane 38 of the propeller at a point spaced above the horizontal axis of rotation 17 of the propeller.

A diagonal bracing strut 40 extends downwardly and rearwardly from the first apex 34 away from the fore legs legs to the base plane of the truss. The bottom of the diagonal bracing strut is spaced aft of the bottoms of the fore legs, and the bottoms of the three members are tied together as a rigid unit in a triangular horizontal base plane truss frame 42 described below. As shown best in FIG. 2, the top of the diagonal bracing strut is spaced a short distance aft of the tops of the fore legs. The tops of these three members support the bottom of the platform 12. The tops of the fore legs are spaced a short distance apart where they support the front of the platform. The axis of the diagonal bracing strut intersects the axes of the fore legs at the first apex 34, i.e., at the axis 17 of rotation of the propeller. The tops of the three members are rigidly secured together by the rigid platform structure. The diagonal bracing strut tapers away from the fore legs along an axis that is equidistantly spaced from each fore leg. Thus, as the tower is viewed from the front in FIG. 3, the diagonal bracing strut is symmetrical with respect to the fore legs and extends along a vertical plane through the vertical axis 36 passing through the first apex. In one embodiment, the diagonal bracing strut extends upwardly from the base plane at an angle of about 53°.

A pair of upwardly converging aft legs 44 extend diagonally upward in an aft direction from the bottom of the fore legs. The aft legs intersect at a second apex 46 spaced aft of the first apex. The second apex is on the horizontal axis of rotation 17 of the propeller. The tops of the aft legs support the aft end of the platform. The upward convergence of the aft legs is symmetrical with respect to the vertical axis 36 through the first and second apexes. The aft legs thus extend diagonally upwardly generally at the same angle of convergence as the fore legs. When the tower is viewed from the side in FIG. 2, the fore legs extend diagonally upwardly from the base plane at an obtuse angle of about 106°. The tops of the aft legs are spaced apart by a short distance and are rigidly secured together by the rigid platform structure.

At regular vertical intervals, horizontal stiffening trusses add rigidity to the beam system. Details of the base plane truss 42 are shown in FIG. 4, and FIGS. 5 through 7 illustrate horizontal stiffening trusses at respectively higher elevations.

The base plane truss frame 42 includes three peripheral beams rigidly interconnected at their ends to form the periphery of a rigid triangular base plane truss frame. The bottoms of the fore legs 32 are rigidly secured to the front corners of the peripheral base plane truss frame. The bottom of the diagonal bracing strut is rigidly affixed to a rear corner of the base plane truss frame. The three peripheral beams of the base plane truss lie in a horizontal plane at the bottom of the tower and they include a front peripheral beam 48 extending across the front of the base plane truss parallel to the vertical plane in which the propeller rotates. A pair of rearwardly converging side peripheral beams 50 extend horizontally from the bottoms of the fore legs along opposite sides of the base plane truss, converging at a rear corner of the base plane truss. The three peripheral beams thus form a rigid triangular peripheral frame that stiffens the bottoms of the fore legs and the diagonal bracing strut at the base of the tower.

Thus, the tower primarily includes a rigid front truss frame, and a pair of rigid side truss frames that converge in an aft direction away from the propeller and away from opposite sides of the front truss frame. Each of the three truss frames is generally upright and converges toward a common apex spaced aft of the propeller and preferably on the propeller axis of rotation. The bottoms of the three truss frames are rigidly tied together by a rigid triangular base plane truss. The three truss frames are rigidly interconnected as a rigid upright structure. Main upright loadtaking members of the truss frames include the fore legs, which are rigidly secured at their bottoms to the front corners of the base plane truss frame, and the diagonal bracing strut, which is rigidly secured at its bottom to the rear corner of the base plane truss frame.

The aft legs cooperate with the fore legs to form a pair of inverted triangular truss frames outboard of the primary side truss frames of the tower. The aft legs cooperate with each other to form a rigid triangular truss frame extending downwardly from the aft end of the platform. These truss frames resist torsional loading in a horizontal direction on the platform.

The bottoms of the aft legs 44 are secured to the base plane truss frame 42 by rigidly affixing them to the side peripheral beams 50 immediately aft of the fore legs.

The peripheral beams of the base plane truss are stiffened by cross-bracing which includes an intermediate cross-brace 52 extending between mid-points of the peripheral side beams 50. A pair of parallel cross-braces 54 extend in an aft direction from intermediate points on the front peripheral beam 48 to the intermediate cross-brace 52. A pair of rearwardly converging diagonal braces 56 extend from the front corners of the base plane truss to the parallel cross-braces 56. A long rear cross-brace 58 extends from the rear corner of the base plane truss to the middle of the intermediate cross-brace 52. A pair of shorter rear cross-braces 60 extend parallel to and along opposite sides of the rear cross-brace 58. Parallel cross-braces 62 extend away from opposite sides of each diagonal brace 56 to the front peripheral beam 48 and to the intermediate cross-brace 52. Parallel cross-braces 64 and 66 extend away from opposite sides of each diagonal brace to the front peripheral beam and to the middle of the side peripheral beams 50.

The central pivot is rigidly interconnected with the rest of the tower through radial beams 68 extending radially outwardly from the pivot to the corners of the base plane truss. The radial beams extend upwardly at a shallow angle from the corners of the truss toward locations on the pivot elevated a short distance above the plane 33 of the base plane truss 42. The pivot includes a central upright axle-receiving post 70 and an axle anchored to ground received in the post. The base plane truss and its cross-bracing can provide a means of support for equipment such as a generator machine room (not shown).

Figure 5:
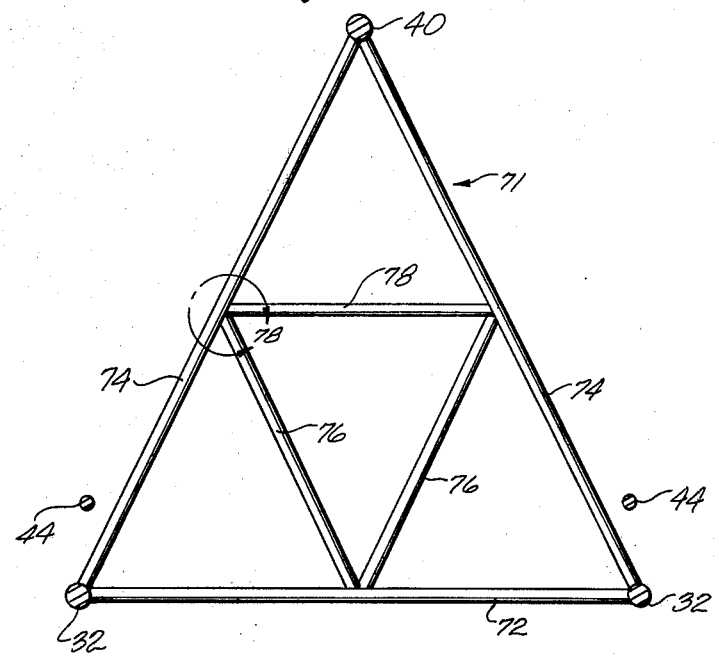
FIG. 5 is a plan view of the tower structure at an elevation taken on line 5—5 of FIG. 3.

FIG. 5 illustrates a lower level horizontal truss frame 71 immediately above the base plane truss 42. The lower horizontal truss frame includes a front peripheral beam 72 rigidly affixed at its ends to sides of the fore legs 32, and a pair of rearwardly converging side peripheral beams 74 rigidly affixed at their front ends to the fore legs and rigidly affixed at their aft ends to the diagonal bracing strut 40. The peripheral beams of the lower truss frame 71 are stiffened by a secondary truss having two rearwardly diverging frame members 76 extending from the middle of the front peripheral beam 72 to the middles of the side peripheral beams 74. The secondary truss also includes an intermediate crossmember 78 extending parallel to the front peripheral beam 72 between the middles of the side peripheral beams 74.

Figure 6:
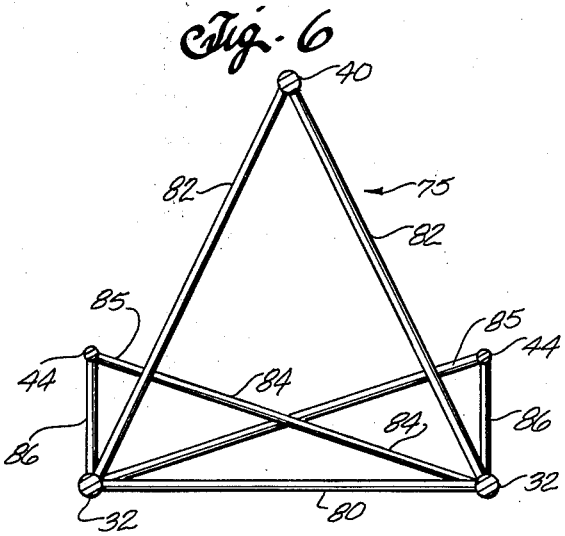
FIG. 6 is a plan view of the tower structure at an elevation taken on line 6—6 of FIG. 3.

FIG. 6 illustrates an intermediate level horizontal truss frame 75 which includes a front peripheral beam 80 rigidly affixed at its ends to sides of the fore legs 32 and a pair of rearwardly converging side peripheral beams 82 rigidly affixed at their front ends to the fore legs and at their aft ends to the diagonal bracing strut 40. Separate long diagonal cross-braces 84 and a corresponding short diagonal cross-braces 85 extend collinearly from each fore leg 32 across to the aft leg 44 on the opposite side of the tower. The long diagonal cross-braces intersect and are rigidly secured to each other at an X-shaped joint aft of the front peripheral beam 80. The adjacent ends of the long and short diagonal cross-braces are rigidly affixed to opposite sides of the side peripheral beams 82. The fore and aft legs are stiffened by a pair of short peripheral braces 86 extending aft from the fore legs to the sides of the aft legs.

FIG. 7 illustrates an upper level horizontal stiffening truss frame 87 spaced immediately below the platform 12. This truss frame includes a front peripheral beam 88 extending between sides of the fore legs and a pair of rearwardly converging diagonal side beams 90 extending from the fore legs to the diagonal bracing truss 40. An intermediate cross-brace 92 extends aft from the middle of the front peripheral beam 80 to the diagonal bracing truss at the same joint where the diagonal side beams 90 are rigidly affixed. Horizontal outer stiffening trusses stiffen each aft leg with respect to an adjacent fore leg and the diagonal bracing truss. Each outer stiffening truss includes a rearwardly extending side peripheral beam 94 extending from a fore leg to an adjacent aft leg, and a rear peripheral beam 96 extending from each aft leg to a side of the diagonal bracing strut at the same joint where the diagonal side beams 90 and the intermediate cross-brace 92 are rigidly secured. Each diagonal side beam 90 comprises a separate member of each horizontal outer stiffening truss.

The fore and aft legs are stiffened above the plane of the upper horizontal truss frame 87 by a pair of converging side beams 98 extending upwardly and rearwardly from the fore legs, in the plane of the upper horizontal truss frame 87, to the tops of the aft legs. The tops of the converging side beams 98 are rigidly affixed to sides of the aft legs immediately adjacent the bottom of the platform.

The fore legs and the diagonal bracing strut are stiffened between the planes of the intermediate and upper horizontal truss frames by a pair of diagonal beams 100 converging upwardly and rearwardly from the fore legs, in the plane of the intermediate horizontal truss frame 75, to the diagonal bracing strut in the plane of the upper horizontal truss frame 87.

The fore legs are stiffened relative to the upper horizontal intermediate truss frame 87 by a generally upright truss frame which includes a pair of front truss members 102 converging upwardly from the fore legs, at their juncture with the ends of the front peripheral beam 80, to the middle of the front peripheral beam 88.

The fore legs are also stiffened relative to the lower horizontal truss frame 71 by a generally upright truss frame which includes a pair of front truss members 104 converging downwardly from the fore legs, at their juncture with the ends of the front peripheral beam 80, to the middle of the front peripheral beam 72. The fore legs also are stiffened relative to the lower horizontal truss frame 71 by a pair of generally upright side truss frame each including a first diagonal truss member 106 extending rearwardly and downwardly from the fore leg, at its juncture with the side peripheral beam 82, to the middle of the side peripheral beam 74; and a second diagonal truss member 108 extending forward and downwardly from the diagonal bracing strut, at its juncture with the side peripheral beam 82, to the middle of the side peripheral beam 74.

The fore legs are stiffened relative to the base plane truss 42 by a generally upright front truss frame which includes a pair of front truss members 110 converging downwardly from the fore legs, at their juncture with the ends of the front peripheral beam 72, to the middle of the front peripheral beam 48 of the base plane truss. The fore legs and the diagonal bracing strut are stiffened with respect to the base plane truss by a pair of side truss frames each including a first truss member 112 extending downwardly and rearwardly from the fore leg, at the joint where the peripheral side beam 74 is connected, to the middle of the base plane peripheral side beam 50; and a second truss frame member 114 extending forward and downwardly from the opposite end of the side peripheral beam 74 to the middle of the base plane side peripheral beam 50.

The tower consists primarily of straight load-taking tubular steel members. In one embodiment, the fore legs 32 comprise 24-inch diameter tubing approximately 100 feet long with a wall thickness of approximately 1.2 inches. The diagonal bracing strut 40 comprises 24-inch diameter tubing approximately 140 feet long with a wall thickness of approximately 1.2 inches. The aft legs 44 are 18-inch diameter tubing approximately 100 feet long with a wall thickness of about 0.75 inch. The front peripheral beam 48 of the base plane truss 42 comprises 24-inch diameter tubing approximately 60 feet long with a wall thickness of about 1.2 inch. The side peripheral beams 50 of the base plane truss also comprise 24-inch diameter tubing with a wall thickness of about 1.2 inches and are about 68 feet long.

FIG. 8 illustrates a presently preferred means for forming a joint of a typical horizontal truss frame. In the illustrated example, the ends of the tubular members 76 and 78 are slotted and a separate ½-inch thick splice plate 116 is fitted into the slotted end of each pipe and welded to the pipe. A 1-inch thick gusset plate 118 is welded to a side of the tubular member 74 at the point where the joint is being formed. The splice plates overlie the gusset plate and the splice plates are fastened to the gusset plate by bolts 120. The splice plates nest in each tubular member by a distance equal to the nominal diameter of the pipe.

There are primarily three forces acting on the tower when the propeller rotates under the influence of the wind. First, a cyclic thrust loading acts on the tower as the propeller blades rotate past the tower. The propeller blades are upwind of the tower since the tower is able to rotate about the pivot with changes in wind direction. Each time a propeller blade passes the tower, an exciting force acts on the tower due to the propeller blades' reaction with the wind. This produces a cyclic horizontal thrust loading that, in effect, pushes and pulls on the tower. Second, the thrust force of the wind against the propeller blades produces cyclic thrust loading on the tower that also, in effect, pushes and pulls on the tower. Third, rotation of the propeller shaft together with operation of rotating machinery on the platform and horizontal movements of the air combine to produce cyclic torsional loading in a horizontal plane at the top of the tower.

The tower has a high natural frequency because of its stiffness which is produced in part by the bottoms of the main load-taking beams, i.e., the fore legs and the diagonal bracing strut, being rigidly affixed to a rigid base plane truss frame. The tower also has a wide base, i.e., the three main load-taking beams converge upwardly from a base having a greater area than the tower has at elevations above the base plane. The height of the tower also is not more than twice the length of any of the peripheral beams in the base plane truss frame, which provides a wide base relative to the height of the tower. The three main load-taking beams also converge together at an apex where they are rigidly secured together at the top of the tower. This configuration, in effect, provides three rigid truss frames in generally upright planes along the three sides of the tower which adds stiffness to the tower structure.

The combination of the three main load-taking beams being tied together in a rigid base plane, together with the tower having a wide base and the three main beams converging to an apex produces a stiff tower with a high natural frequency. In one embodiment the natural period of the tower is 0.3 second which is lower than the 0.49 second period of the passing propeller blades. Since the natural frequency of the tower is higher than the first mode passing frequency of the propeller blades, the stiffness of the tower considerably reduces resonant vibrations in the tower caused by cyclic thrust loading due to rotation of the propeller blades.

The rigid diagonal bracing strut acts as a compressive member to support thrust loading on the tower. Since the tower is free to rotate about its base and since all three main load-taking beams are rigidly tied together in the base plane, the diagonal bracing strut resists essentially all of the thrust loading on the tower.

The tops of the two independent aft legs are spaced as far as practical from the tie point at the tops of the fore legs. The tops of the aft legs and the fore legs are rigidly stiffened relative to one another owing to their rigid connection to the tower platform. The aft legs cooperate with the fore legs to resist torsional moments in a horizontal plane at the top of the tower.

The fore legs also act as compressive members to support the entire weight of the propeller and the tower rotating machinery load on the tower platform.

The tower is readily scaleable up to large heights, say over 100 feet in height, while maintaining a high degree of required rigidity.

What is claimed is:

1. A windmill tower comprising:
   a tower;
   a propeller for rotating in a plane forward of the tower;
   the tower having a pair of fixed fore legs spaced apart at their bottoms and converging upwardly toward an apex, and a fixed diagonal bracing strut having a bottom spaced aft of the bottoms of the fore legs, with respect to the plane of the propeller rotation, and extending diagonally upwardly toward said apex, the fore legs and the diagonal bracing strut having top portions in the vicinity of said apex spaced aft of the plane of propeller rotation;
   a pair of fixed aft legs having top portions spaced aft of said apex, with respect to the plane of propeller rotation, and extending downwardly adjacent opposite sides of the diagonal bracing strut, each aft leg converging downwardly toward the bottom portion of a corresponding fore leg, the aft legs being braced in a fixed position relative to the fore legs;
   load support means secured to the top portions of the fore legs and the diagonal bracing strut and the aft legs for supporting a load from the propeller; and
   means rigidly interconnecting the bottoms of the fore legs and the bottom of the diagonal bracing strut at a base of the tower.

2. The windmill according to claim 1 wherein the fore legs and the diagonal bracing strut converge upwardly toward a first apex, and the aft legs converge upwardly toward a second apex spaced aft of the first apex with respect to the plane of the propeller.

3. The windmill according to claim 2 including means rigidly interconnecting the top portions of the aft legs and the top portions of the fore legs and the diagonal bracing strut.

4. The windmill according to claim 3 wherein each aft leg and a corresponding fore leg converge downwardly toward a separate third apex.

5. The windmill according to claim 4 in which each third apex is generally in a base plane of the tower.

6. The windmill according to claim 2 wherein the first and second apexes are on a substantially horizontal axis.

7. The windmill according to claim 6 in which the load support means comprises a platform supporting at least a portion of the propeller.

8. A windmill according to claim 7 in which said horizontal axis is above the platform, and the propeller is rotatable about the horizontal axis.

9. The windmill according to claim 1 in which the fore legs are in a common plane extending diagonally upwardly toward a vertical plane in which the propeller rotates, the bottoms of the fore legs being aft of said apex, with respect to the plane of propeller rotation.

10. The windmill according to claim 9 in which the aft legs are rigidly secured at respective joints with the bottoms of corresponding fore legs, and the aft legs are in a common plane extending diagonally upwardly away from the bottoms of the aft legs.

11. The windmill according to claim 10 in which the aft legs converge upwardly toward an apex spaced aft of the apex toward which the fore legs and the diagonal bracing strut converge.

12. The windmill according to claim 1 in which the propeller has blades rotating in a vertical plane adjacent the tower, and the tower has a natural frequency higher than the passing frequency of the rotating propeller blades.

13. The windmill according to claim 1 in which the means rigidly interconnecting the bottoms of the fore legs and the diagonal bracing strut comprises a rigid triangular base plane truss frame.

14. The windmill according to claim 13 in which the aft legs converge downwardly toward the bottoms of corresponding fore legs, and the aft legs converge upwardly toward each other.

15. The windmill according to claim 14 in which each aft leg and its corresponding fore leg converges toward a respective apex generally in the plane of the base plane truss frame.

16. The windmill according to claim 15 including means rigidly securing the bottoms of each fore leg and associated aft leg to a corresponding front corner of the base plane truss frame.

17. The windmill according to claim 16 in which the base plane truss frame has a rear corner aft of the front corners, with respect to the plane of the propeller, and the bottom of the diagonal bracing strut is rigidly secured to said rear corner.

18. The windmill according to claim 1 including means for pivoting the tower and propeller as a unit about a substantially upright axis in response to changes in wind direction so the propeller can maintain a position upwind of the tower.

19. The windmill according to claim 18 in which the diagonal bracing strut extends in a vertical plane, and the propeller rotates about an axis which is fixed with respect to the tower, and the vertical plane of the strut is co-planar with the axis of rotation of the propeller.

20. A windmill comprising:
   a propeller for rotating about a generally horizontal axis;
   a tower supporting the propeller above the ground so that the horizontal axis of propeller rotation is fixed relative to the tower; and
   means for pivoting the tower and propeller as a unit about an essentially upright axis in response to changes in wind direction so the propeller can maintain a position upwind of the tower;
   the tower having a pair of upwardly converging fixed fore legs adjacent the propeller; a diagonal bracing strut having a bottom spaced aft of bottoms of the fore legs with respect to the axis of propeller rotation, the diagonal bracing strut extending upwardly toward a point of convergence of the fore legs; means rigidly interconnecting top portions of the fore legs and the diagonal bracing strut; means rigidly interconnecting bottom portions of the fore legs and the diagonal bracing strut; and fixed load-taking beams having top portions spaced aft of the point of convergence of the fore legs and the diagonal bracing strut and converging downwardly toward the bottoms of corresponding fore legs for resisting torsional moments acting in a horizontal plane at said top portions of the fore legs and the diagonal bracing strut.

21. The windmill according to claim 20 in which the fore legs extend diagonally upwardly toward a vertical plane in which the propeller blades rotate, and the bottoms of the fore legs are spaced aft of the plane of rotation.

22. The windmill according to claim 20 in which the load-taking beams comprise a pair of aft legs, the bottom of each aft leg being rigidly affixed adjacent a bottom of a corresponding fore leg, the aft legs extending diagonally upwardly in an aft direction from the plane of propeller rotation.

23. The windmill according to claim 22 in which the aft legs have top portions that converge upwardly toward one another.

24. The windmill according to claim 23 including means rigidly securing the top portions of the aft legs in a fixed position relative to the top portions of the diagonal bracing strut and the fore legs.

25. The windmill according to claim 24 in which a point of convergence of the aft legs and said point of convergence of the fore legs and the strut both lie generally on the horizontal axis of rotation of the propeller.

26. The windmill according to claim 22 in which each aft leg and a corresponding fore leg converge downwardly toward a point of convergence generally in a horizontal base plane of the tower.

27. The windmill according to claim 26 including peripheral truss members in said horizontal base plane forming a rigid triangular base plane truss rigidly interconnecting the bottoms of the fore legs and the diagonal bracing strut.

28. The windmill according to claim 27 in which the length of each peripheral truss member is more than half the height of the tops of the fore legs and the diagonal bracing strut above the base plane truss frame.

29. The windmill according to claim 27 in which the base plane truss frame has a pair of front corners at which bottoms of the fore legs are rigidly secured; and a rear corner spaced aft of the front corners, with respect to the propeller plane of rotation, the bottom of the diagonal bracing strut being rigidly affixed at the rear corner.

30. The windmill according to claim 20 in which the diagonal bracing strut extends in a generally vertical plane that is essentially co-planar with the axis of propeller rotation.

31. A windmill tower comprising:
a propeller;
a tower supporting the propeller above the ground;
the propeller having blades for rotating in a plane adjacent a front side of the tower;
means for pivoting the tower and the propeller as a unit about an upright axis generally parallel to the propeller plane of rotation;
the tower including a front truss frame spaced aft of the propeller, the front truss frame having a pair of upwardly extending opposite front edges; and a pair of side truss frames converging away from the front edges of the front truss frame in an aft direction with respect to the plane of propeller rotation; each truss frame having a respective base in a base plane of the tower;
the front truss frame being relatively wider at its base and tapering narrower toward an apex at a top of the tower, the side truss frames each having a relatively wider base and upwardly extending portions tapering narrower toward said apex;
means rigidly interconnecting the bases of the front truss frame and the side truss frames as a rigid triangular base plane truss frame; and
means securing upwardly extending portions of the front truss frame and the side truss frames together as a rigid unit.

32. The windmill according to claim 31 in which the base plane truss frame has a pair of front corners at the front edges of the front truss frame and a rear corner toward which the side truss frames converge; and the apex toward which the three truss frames converge is aft of the propeller.

33. The windmill according to claim 32 in which the side truss frames include a rigid diagonal bracing strut extending downwardly from the vicinity of said apex to the rear corner of the base plane truss frame.

34. The windmill tower according to claim 1 in which the means for resisting torsional moments comprises a pair of fixed aft beams extending upwardly generally from lower front corners of the front truss frame toward a rear apex spaced aft of the other apex toward which the front and side truss frames converge.

35. The windmill according to claim 34 in which both apexes are aligned on the axis of rotation of the propeller.

36. The windmill according to claim 34 including means rigidly interconnecting a top portion of each aft beam with a respective front edge of the front truss frame to form a pair of inverted triangular truss frames outboard of the side truss frames for resisting said torsional moments.

37. A windmill tower comprising:
a tower;
a propeller supported atop the tower for rotation in an upright plane spaced in front of the tower, said rotation being about a generally horizontal axis of rotation;
means for pivoting the tower and the propeller as a unit about a generally upright axis spaced aft of the plane of propeller rotation; and
a load coupled to a shaft on the propeller axis of rotation supported by the tower aft of the plane of propeller rotation;
the tower having rigidly interconnected structural frames in three generally upright planes converging upwardly toward an apex from a rigid base of the tower, the load being supported in the vicinity of said apex; the structural frames forming a front face and a pair of rearwardly converging side faces of the tower; the front face having front load-taking members supporting said load; the side frames having a rear load-taking member for resisting compressive loads due to thrust forces on the front face of the tower; and torsional load-taking members fixed with respect to the side faces of the tower and having top portions thereof located aft of the apex for supporting said load and converging downwardly toward bottom portions of the front load-taking members so as to cooperate with the front load-taking members to resist torsional moments acting in a horizontal plane in the vicinity of said load.

38. The windmill according to claim 37 in which the propeller has blades for rotating past the front face of the tower, and the natural frequency of the tower is lower than the passing frequency of the blades.

39. The windmill according to claim 37 in which the front load-taking members and the rear load-taking members are rigidly secured to front corners and to a rear corner, respectively, of a rigid triangular base plane truss frame.

40. The windmill according to claim 39 in which bottoms of the torsional load-taking members are rigidly secured at front corners of the base plane truss frame.

41. The windmill according to claim 40 in which the torsional load-taking members converge upwardly toward a rear apex aft of the other apex toward which the three structural frames converge; and both apexes are aligned generally on the horizontal axis of rotation of the propeller.

42. The windmill according to claim 37 in which said apex is generally on the horizontal axis of rotation of the propeller.

43. The windmill according to claim 18 in which the means interconnecting the bottoms of the fore legs and the diagonal bracing strut comprises a rigid triangular base plane truss frame.

44. The windmill according to claim 43 in which the bottoms of the fore legs lie in a plane substantially parallel to the plane of rotation of the propeller.

45. The windmill according to claim 20 in which the means rigidly interconnecting bottom portions of the fore legs and the diagonal bracing strut comprises a rigid triangular base plane truss frame.

46. The windmill according to claim 45 in which the bottoms of the fore legs lie in a plane substantially parallel to the plane of rotation of the propeller.

47. The windmill according to claim 31 including means for resisting torsional moments acting in a horizontal plane in the vicinity of said apex.

48. The windmill according to claim 31 in which the base of the front truss frame lies in a plane substantially parallel to the plane of rotation of the propeller.

49. The windmill according to claim 37 including means rigidly interconnecting a top portion of each torsional load-taking member with a corresponding front load-taking member to form a pair of inverted triangular truss frames outboard of the side faces of the tower for resisting said torsional moments.

50. The windmill according to claim 49 in which the torsional load-taking members converge upwardly toward a rear apex spaced aft of the other apex toward which the three structural frames converge.

51. The windmill according to claim 50 in which both apexes are aligned generally on the horizontal axis of rotation of the propeller.

52. The windmill according to claim 39 in which the bottoms of the front load-taking members lie in a plane substantially parallel to the plane of rotation of the propeller.

* * * * *

UNITED STATES PATENT AND TRADEMARK OFFICE
CERTIFICATE OF CORRECTION

PATENT NO. : 4,323,331

DATED : April 6, 1982

INVENTOR(S) : Charles Schachle et al

It is certified that error appears in the above-identified patent and that said Letters Patent are hereby corrected as shown below:

Column 4, line 25, delete second occurrence of "legs". Column 6, line 30, delete "a". Column 7, line 22, "frame" should read -- frames --; line 57, "inch" should read -- inches --. Column 12, claim 38, line 61, "lower" should read -- higher --; claim 39, line 64, "members" should read -- member --.

Signed and Sealed this

Seventh Day of September 1982

[SEAL]

*Attest:*

GERALD J. MOSSINGHOFF

*Attesting Officer*   *Commissioner of Patents and Trademarks*